United States Patent [19]

Miyoshi

[11] Patent Number: 5,027,398

[45] Date of Patent: Jun. 25, 1991

[54] COPY PREVENTION APPARATUS AND METHOD THEREFOR

[75] Inventor: Akio Miyoshi, Ome, Japan

[73] Assignee: Kabushiki Kaisha Toshiba, Kawasaki, Japan

[21] Appl. No.: 512,590

[22] Filed: Apr. 24, 1990

Related U.S. Application Data

[63] Continuation-in-part of Ser. No. 269,358, Nov. 10, 1988, abandoned.

[30] Foreign Application Priority Data

Nov. 13, 1987 [JP] Japan ................................ 62-286985

[51] Int. Cl.⁵ ......................... G11B 23/28; G05B 9/02
[52] U.S. Cl. ........................................... 380/4; 380/3; 380/52; 364/184; 340/653; 361/380
[58] Field of Search ............................. 350/3, 4, 52, 59; 340/652, 653; 357/85; 360/60; 361/380; 364/184; 365/52, 120, 244; 902/28; 235/438

[56] References Cited

U.S. PATENT DOCUMENTS

| | | | |
|---|---|---|---|
| 4,583,011 | 4/1986 | Pechar | 307/440 |
| 4,740,890 | 4/1988 | William | 380/4 X |
| 4,766,516 | 8/1988 | Ozdemir et al. | 361/380 |
| 4,785,361 | 11/1988 | Brotby | 360/60 |
| 4,835,682 | 5/1989 | Kurachi et al. | 380/4 X |
| 4,849,836 | 7/1989 | Kachikian | 360/60 |
| 4,866,769 | 9/1989 | Karp | 380/4 |

Primary Examiner—Linda J. Wallace
Attorney, Agent, or Firm—Foley & Lardner

[57] ABSTRACT

In the copy prevention apparatus and its method, it is discriminated whether an object is legally copied or not; a constant event is generated at or below a predetermined probability; and an abnormal operation is executed only if the two conditions of the object having been determined as an illegal copy, and the event having been generated, are satisfied. Therefore, even if the object is determined as an illegal copy, the abnormal operation is not always executed, but executed at or below a predetermined probability. Although the occurrence of the abnormal operation can be indicated to the user immediately, it is also preferable to keep the abnormal operation occurrence secret for a time and inform the user of the occurrence an appropriate time later.

9 Claims, 8 Drawing Sheets

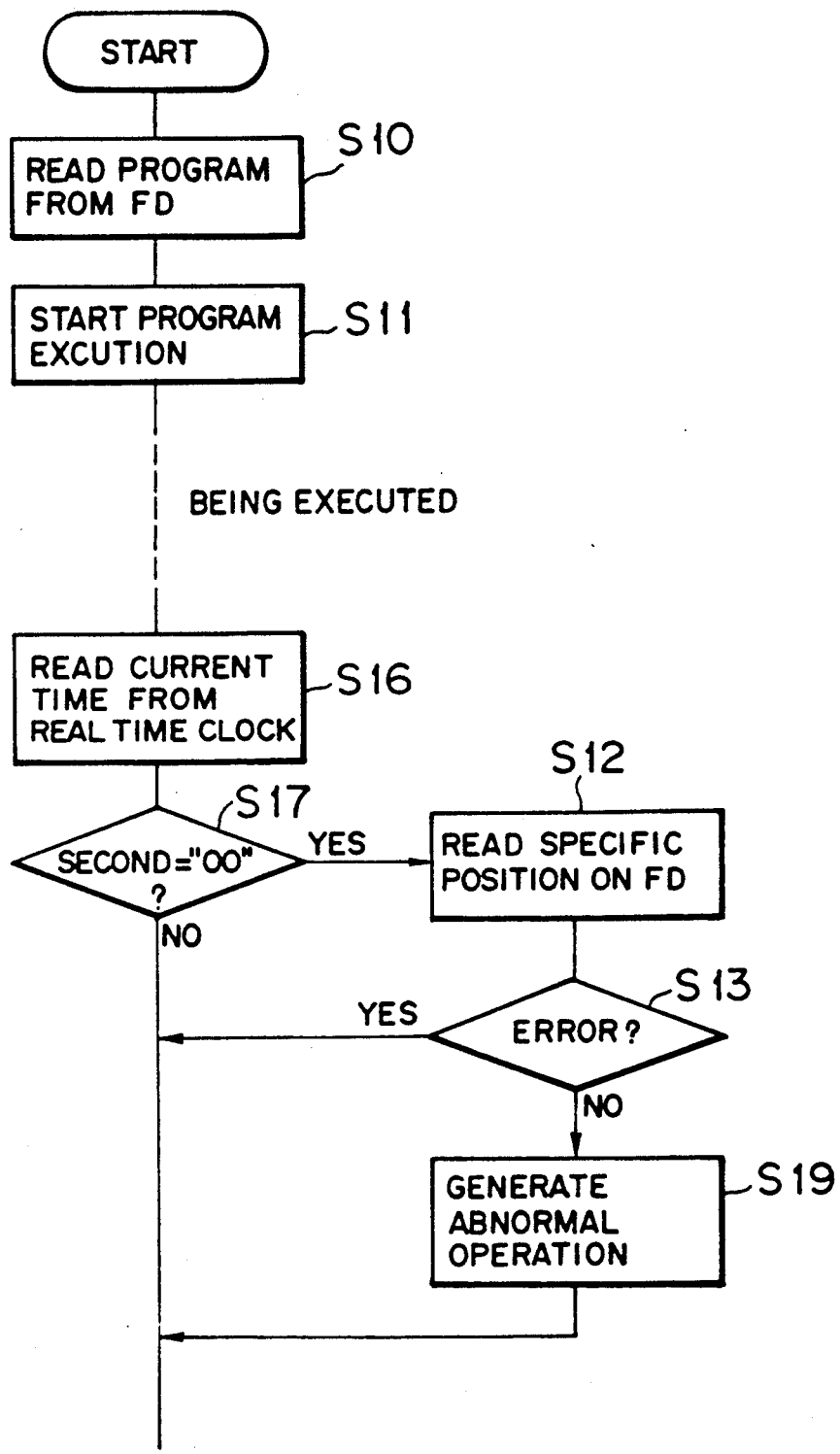
F I G. 5

COPY PREVENTION APPARATUS AND METHOD THEREFOR

This application is a continuation-in-part of application Ser. No. 07/269,358, filed Nov. 10, 1988, now abandoned.

BACKGROUND OF THE INVENTION

1. Field of the Invention the present invention relates to a copy prevention apparatus and a method of preventing intellectual property such as computer software or semiconductor circuits form being copied illegally.

2. Description of the Prior Art

In software on the market for personal computers, a special countermeasure against illegal copying has been conventionally provided for the memory medium. For example, copy program operation is disabled by inhibiting part of memory medium from being read by ordinary methods. Furthermore, even if software is copied without copying the inhibited part of the memory medium, when the inhibited part can be read normally at the start of software or when the erroneous phenomenon caused when the inhibited part is not read, is different from that determined by the original software, the program is stopped because the software itself determines that the program has been copied illegally.

Furthermore, in the case of semiconductor circuits such as microprocessors, unnecessary gates disabled by ion implantation have been conventionally provided by copy prevention, so that when the gates are copied, the circuit will not operate normally.

In the prior-art software copy prevention method, however, even if some countermeasure has been considered for the memory medium, since violators who copy software, compare the illegally copied software with the original, and improves the copying means by repeatedly analyzing the difference between the two until the copied software can operate normally, it has been difficult to prevent software from being illegally copied in this manner.

On the other hand, in the case of software, since the value of software cannot be recognized until the software is actually used, when the software is protected perfectly, there exists a problem in that the user must purchase software for which value is unknown at the risk of disuse.

Furthermore, in the case of semiconductor circuits, violators who want to copy the circuits can realize the circuits on bread boards as they are by repeatedly searching for the causes when the circuits do not operate normally.

As described above, in the prior-art software copy prevention method, new methods of removing the copy protection are always being sought and therefore a vicious and meaningless cycle of protection development and protection removal is repeated. On the other hand, there exists another problem in that the value of software is recognized only after the software has been tested. Therefore, there exists a strong need for providing a more perfect means for preventing intellectual property such as software or semiconductor circuits from being copied illegally.

SUMMARY OF THE INVENTION

With these problems in mind, therefore, it is the primary object of the present invention to provide a copy prevention apparatus which can effectively prevent illegal copying by making it difficult to confirm that copy protection has been removed, but that on the other hand, can permit the copy to be tested normally for confirmation of the contents or values thereof.

It is another object of the present invention to provide a copy prevention method which can effectively prevent illegal copying but that can permit the copy to be tested.

According to one aspect of the present invention, a copy prevention apparatus is provided, which comprises illegal copy discriminating means for discriminating whether an object has been legally copied; event generating means for generating a constant event at or below a predetermined probability; and abnormal operation generating means for generating a predetermined abnormal operation when said illegal copy discriminating means discriminates an illegal copy and said event generating means generates the predetermined event.

According to another aspect of the present invention, a method is provided, which comprises the steps of discriminating whether an object is legally copied; generating a constant event at or below a predetermined probability; and generating a predetermined abnormal operation only when an illegal copy is discriminated and the predetermined event is generated.

According to the present invention, when an illegal copy is found, an abnormal operation is generated not always but with a predetermined probability. Therefore, it is difficult for illegal people who want to copy, to discriminate whether the copy is the same as the original or whether the protection for the original has been removed perfectly. In other words, the prior-art methods have been studied to make it difficult to remove the copy protection. However, the method of the present invention makes it difficult to discriminate whether the copy protection has been removed. Therefore, it is difficult to find the location of the protection, and the copied software cannot be used properly or sold in a large scale because there exists a probability that protection still remains even if the copied software appears perfect for the time being.

Furthermore, when the event generation probability is determined at such a low value that no abnormal operation will be generated in the ordinary test, it is also possible to allow the copied software or circuits to be used for trial only. In one modification of the present invention, when an illegal copy is found and the above event is generated, it is also possible to temporarily keep an abnormal operation generation secret from the user and to inform the user of the abnormal operation later. In this case, it becomes difficult to check when abnormal operation occurred, and therefore to find the secret protection.

BRIEF DESCRIPTION OF THE DRAWINGS

The features nd advantages of the copy prevention apparatus and the method of the present invention will be more clearly appreciated from the following description taken in conjunction with the accompanying drawings in which:

FIG. 5 is a flowchart for assistance in explaining another operation of the copy prevention apparatus of the present invention shown in FIG. 2;

DETAILED DESCRIPTION OF THE PREFERRED EMBODIMENTS

Embodiments of the copy prevention apparatus according to the present invention will be described hereinbelow by comparison with the prior-art prevention apparatus and with reference to the attached drawings.

Figure 1:
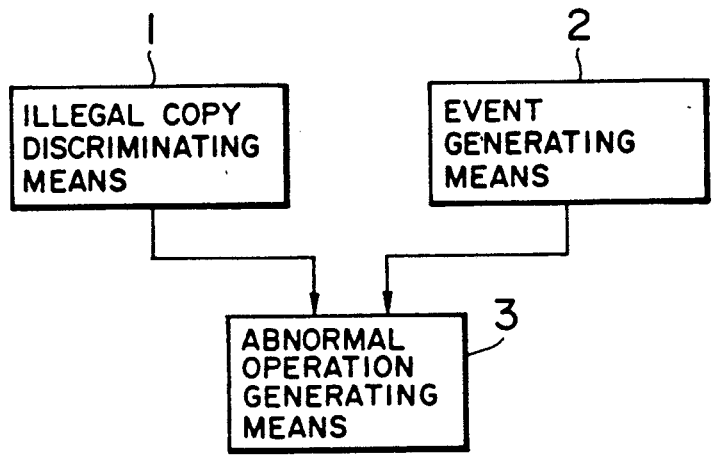
FIG. 1 is a block diagram showing a copy prevention apparatus of the present invention.

FIG. 1 is a block diagram showing a basic configuration of a copy prevention apparatus of the prevent invention. The apparatus comprises illegal copy discriminating means 1, event generating means 2, and abnormal operation generating means 3.

Illegal copy discriminating means 1 checks whether a given object (i.e. copy) is the same as the original, and discriminates the given object as an illegal copy when not the same. Where the object is software, for instance, the difference between the object and the original is determined by checking whether a specific software portion (called protect) includes the contents which can generate an error. Furthermore, when the object is a semiconductor circuit, the difference is determined by checking whether an element, formed as a dummy and therefore inoperative in the original, is operative in the copy.

Event generating means 2 generates a specific event at or below a predetermined probability. An example of an event generated with a certain probability is the specific current times (e.g. times with "00" seconds). This is because the specific times (e.g. "00" seconds) occur once within a predetermined time duration (e.g. 1 minute). Furthermore, in the case of a semiconductor circuit, it is possible to utilize an event where a plurality of signals are all logically "1" or "0", because this event occurs with a predetermined probability.

Means 3 generates a predetermined abnormal operation only if the two conditions of means 1 having discriminated an illegal copy, and means 2 having generated a predetermined event, are satisfied. Therefore, the abnormal operation is not necessarily generated whenever an illegal copy is discriminated, but at or below a predetermined probability.

The copy prevention apparatus as described above can be realized in various modifications according to the object to be protected. For instance, where the object is computer software, the copy prevention apparatus of the present invention is usually incorporated in a computer system. That is, the copy prevention apparatus can be realized by means of a microprocessor, a program for operating the microprocessor, and auxiliary peripheral units in combination. In this case, the microprocessor functions as illegal copy discriminating means 1, event generating means 2, or the abnormal operation generating means 3, according to the progress of program execution. Where an object to be protected is a semiconductor circuit, the copy prevention apparatus is usually integrated on a semiconductor substrate together with the semiconductor circuit. Therefore, the copy prevention apparatus is to be copied simultaneously when the semiconductor circuit is copied. That is, when an illegally copied semiconductor circuit is used, since the simultaneously copied copy prevention apparatus is operative, an abnormal operation occurs with a predetermined probability.

Preferred embodiments of the apparatus of the present invention will be described in detail hereinbelow of the case where the object to be protected is computer software or a semiconductor circuit, with reference to the attached drawings.

First, a software copy prevention apparatus of the present invention will be described by comparison with the prior-art apparatus.

Figure 2:
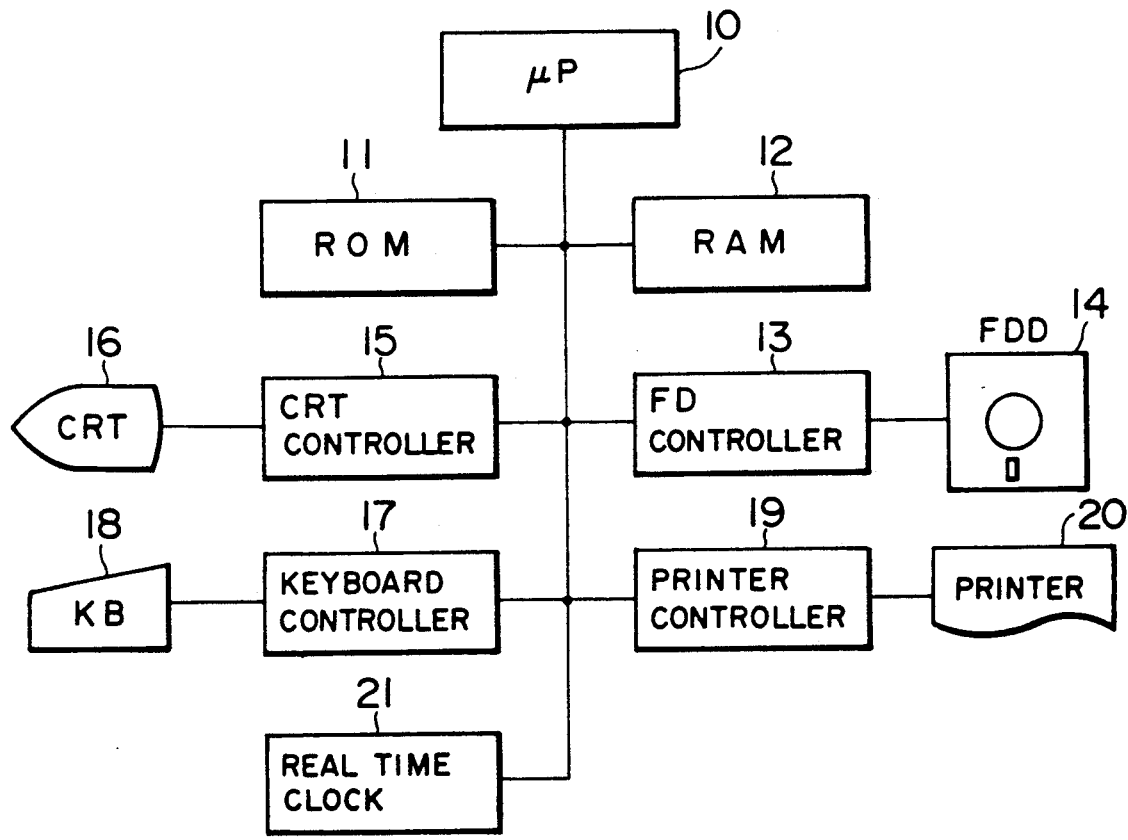
FIG. 2 is a block diagram showing an embodiment of the copy prevention apparatus of the present invention for protecting personal computer software.

FIG. 2 is a block diagram showing an embodiment of the apparatus of the present invention realized by a personal computer, which can protect software.

A microprocessor 10 executes instructions in accordance with programs stored in ROM 11 or a RAM 12; reads or writes new programs and data to or from a floppy disk 14 via a floppy disk controller 13; displays messages and data read by a keyboard 18 via a keyboard controller 17 on a CRT screen 16 via a CRT controller 15; and outputs executed results to a printer 20 via a printer controller 19. Furthermore, a real time clock 21 indicates the current time.

Figure 3:
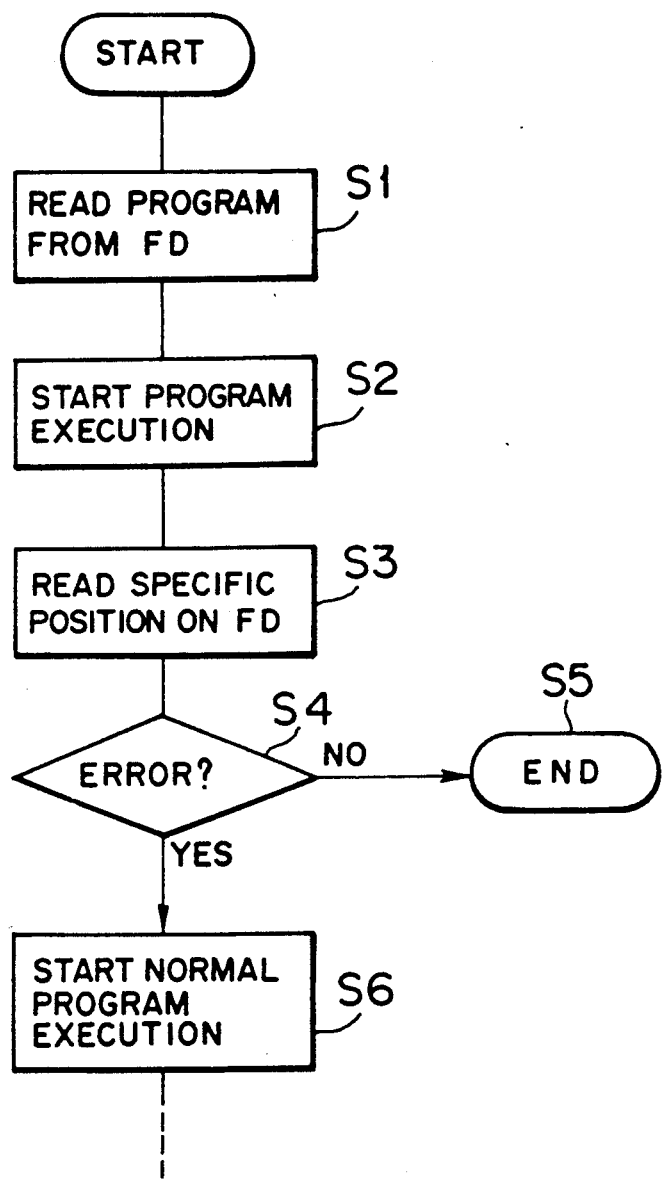
FIG. 3 is a flowchart for assistance in explaining the operation of a prior-art copy prevention apparatus for protecting personal computer software.

In the personal computer as described above, in order to prevent the programs written on the floppy disk 14 from being copied illegally, a prior-art copy prevention program as shown in FIG. 3 has conventionally been included in programs loaded from a ROM or a floppy disk to a RAM. In this prior-art method, recording medium conditions are modified from the ordinary conditions at specific positions on a legal floppy disk, and if no errors occur when the specific positions are read, the floppy disk is determined to be an illegally copied disk.

In more detail, control first reads programs from a floppy disk (in step S1) and starts program execution (in step S2). Therefore, control reads a specific position on the floppy disk (in step S3) nd checks whether an error occurs or not (in step S4). If no error occurs (in step S4), control determines the floppy disk as an illegal disk and ends the program execution (in step S5). In contrast with this, if an error occurs (in step S4), control starts the normal program execution (in step S6).

Figure 4:
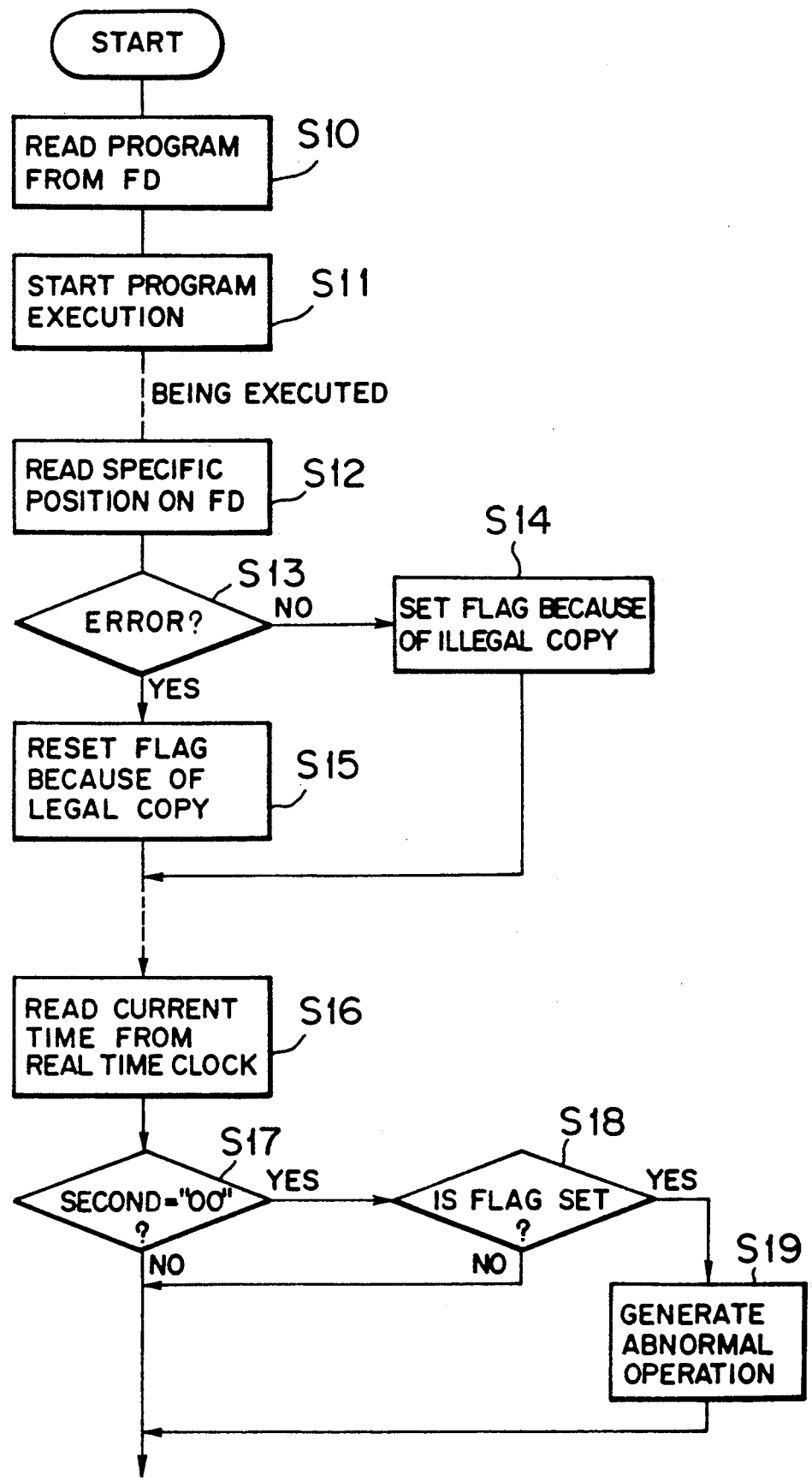
FIG. 4 is a flowchart for assistance in explaining the operation of the copy prevention apparatus of the present invention shown in FIG. 2.

In contrast with the prior-art program as shown in FIG. 3, in the present invention a program as shown in FIG. 4 is loaded in the ROM 11 or a floppy disk to realize one embodiment of the present invention.

In the same way as in the prior-art program explained with reference to FIG. 3, in this embodiment, a specific position on a floppy disk 14 is formed under conditions different from the ordinary medium conditions, and control determines the floppy disk as an illegal copy if no error occurs when this specific position is read.

In more detail, with reference to FIG. 4, the microprocessor 10 reads programs from a floppy disk 14 now set (in step S10) and executes the program (in step S11). This specific position is checked while the program is being executed, without being limited to the time immediately after the program execution has been started as in the prior-art program shown in FIG. 3. At any time during program execution, control reads a specific position on the floppy disk (in step S12). If no error occurs (in step S13), control determines the floppy disk as an illegally copied floppy disk and only sets a flag (in step S14). In this case, even if an illegal copy is found, only a flag is set without interrupting the program execution. If an error occurs (in step S13), since this indicates a legal floppy disk, the flag is kept reset (in step S15).

Thereafter, control reads the current time of the real time clock 21, when writing document data in a file in an application such as a word processor, for instance (in step S16), and checks whether the current time is a specific time (e.g. "00") (in step S17). If "00" second, control checks whether the flag is set because of the presence of illegal copy (in step S18). If set, control executes an abnormal operation (in step S19). This abnormal operation is such that the message "this document is formed by illegally copied word processor software" is added to the document data.

As described above, even if an illegal copy has been found, the program continues to be executed normally. However, an abnormal operation is generated only when document data are written in a document file at a specific time. Therefore, immediately after the disk has been copied, the violator cannot know whether the disk has been copied perfectly or not. However, the user can know that the disk is illegal when an abnormal operation is generated sometime after the disk has been sold. Furthermore, even if an abnormal operation is generated while the copied disk is being tested, since the test operator first recognizes the abnormal operation when the document file is displayed again, the test operator cannot know when the abnormal operation occurred. In other words, violators who want to copy cannot determine when and how the abnormal operation occurs. In addition, since the abnormal operation occurs at a low probability and there exists no reproducibility, it si difficult to analyze and counter with the copy prevention method of the present invention. Therefore, if copied disks are used or sold on a large scale because software can easily be copied, since abnormal operations will appear in the future, violators who have copied disks illegally will lose their credit or sustain great damage, thus making it possible to effectively prevent software from being copied illegally.

Furthermore, when a plurality of check points are provided, even if an effective countermeasure is taken against one check point, it is difficult to take all countermeasures against all the check points, thus making the software protection removal extremely difficult. In the case of software, it is practically impossible to read the program from an object code because of its great laborious work. In other words, when the program of the present invention is inserted midway in the program, it is impossible to find the location of the program.

On the other hand, since the abnormal operation is not always generated in the illegally copied disks and therefore the software operates normally when only tested, it is possible to temporarily use the copied disk for trial in order to judge the value of the copied software.

FIG. 5 is a flow chart showing another example of illegal copy preventing method of software, carried out in connection with the computer shown in FIG. 2. In this example, the determination of illegal copy is effected only in a case of occurring a predetermined event. More specifically, current time is read (S16) out of the realtime clock when a suitable time has passed after the initiation of a program, and only when the current time is a specific time (00 second), a predetermined position of the floppy disk is read out for checking whether the disk is copied illegally or not (S17, S12). When no error is found out in this check, the occurrence of an illegal floppy disk (abnormal operation) is displayed (S13, S19).

The advantage of this example resides in that taking countermeasures against the check point is more difficult than in the example shown in FIG. 4. Since no check for illegality is carried out where a specific event is not found out (that is, the result of the current time check is not 00 second), whether the software of the floppy disk is illegally copied or not cannot be discriminated by simply investigating the content of the memory of the computer while a program is executed. That is, the position of the checking point in the software is not clear, and hence taking countermeasures against the checking point is difficult.

Figure 6:
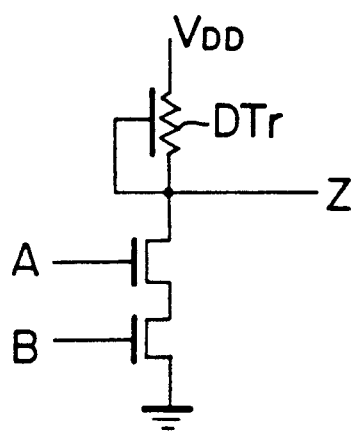
FIG. 6 is a prior-art circuit diagram showing a NAND gate.
Figure 7:
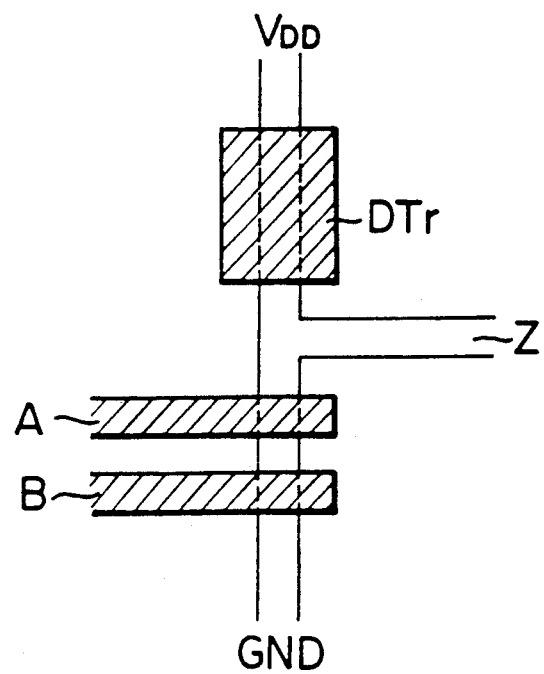
FIG. 7 is a prior-art circuit pattern diagram for realizing the NAND gate shown in FIG. 6 by a semiconductor device.

The copy prevention apparatus applied to a semiconductor circuit will be described hereinbelow. FIG. 6 shows a NAND gate which has a logical function as $Z = A \cdot B$. FIG. 7 is an example of layout pattern used to form this NAND gate by an N-MOS semiconductor device.

In FIG. 7, since the potential at diffusion layer Z is pulled up by a depletion type transistor DTr, if the potentials at polysilicon layers A and B are both at "1", the diffusion layer Z is connected to GND as $Z = 0$. In the case other than the above, the diffusion layer is kept at $Z = 1$.

In the prior-art copy prevention method, when a gate of $Z = \overline{A}$ is required to be protected, for instance, a polysilicon pattern B which looks as $Z = A \cdot B$ is additionally formed as shown in FIG. 6 and a region near a point of intersection of the polysilicon pattern B and the diffusion layer Z is formed into a conductive state by ion implantation, in order to disable the B gate. Since it is difficult to recognize the ion implantation by visual check, if ions are not implanted, the gate will be operated erroneously.

Figure 8:
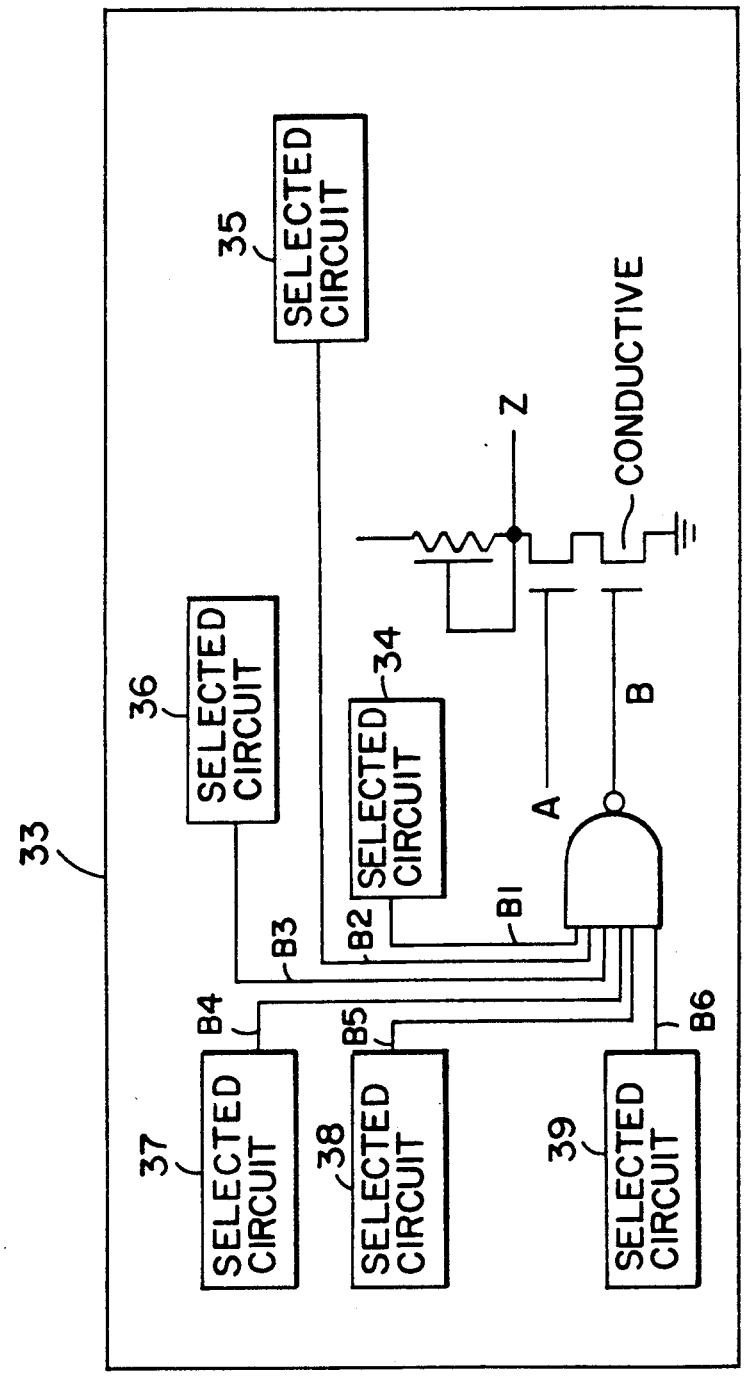
FIG. 8 is a circuit diagram showing another embodiment of the copy prevention apparatus of the present invention, for protecting a NOT gate formed by the semiconductor circuit shown in FIG. 7.

In contrast with this, an embodiment of the present invention is configured as shown in FIG. 8. In FIG. 8, the entire circuit 33 is constructed in the form of an IC or LSI of, for instance, a microprocessor or memories. In the entire circuit 33 are included various types of circuits such as counters, flip-flops, registers, shift-registers and the like. According to this invention, some of these circuits, for instance, those designated by 34–39 are selected, and their output signals B1–B6 are inputted to a NAND gate C. In a case where the entire circuit 33 is an illegal copy, a dummy gate B is turned OFF when all of the output signals B1–B6 become "1", so that an erroneous operation thereof can be provided.

In the same way as in the prior-art NAND gate, in this embodiment, the B gate is disabled by ion implantation in the original circuit, so that $Z = \overline{A}$ is obtained irrespective of the logical value of the signal B. This B gate corresponds to the illegal copy discriminating means 1 shown in FIG. 1. Furthermore, an output terminal of a multi-input NAND gate C is connected to an input terminal of this disabled dummy gate B. This NAND gate corresponds to the event generating means 2 shown in FIG. 1, and the gates A and B correspond to the abnormal operation generating means 3 shown in FIG. 1.

When the NAND gate shown in FIG. 8 is copied without implanting ions at the gate B, the gate functions as $Z = A \cdot B$. However, since the output of the multi-input NAND gate C is always at $B = 1$ except $B1 = B3 = B4 = B5 = B6 = 1$, this gate C functions as $Z = \overline{A}$ as if this gate C is a legal circuit, thus making it difficult to discriminate the difference between legal and illegal semiconductor circuits. For instance, if all the input terminals B1, B2, ..., B6 are output signals of counters, an erroneous operation (abnormal operation) occurs only when all the counter output bits are at "1". However, no erroneous operation occurs in the cases other than the above case.

Figure 9:
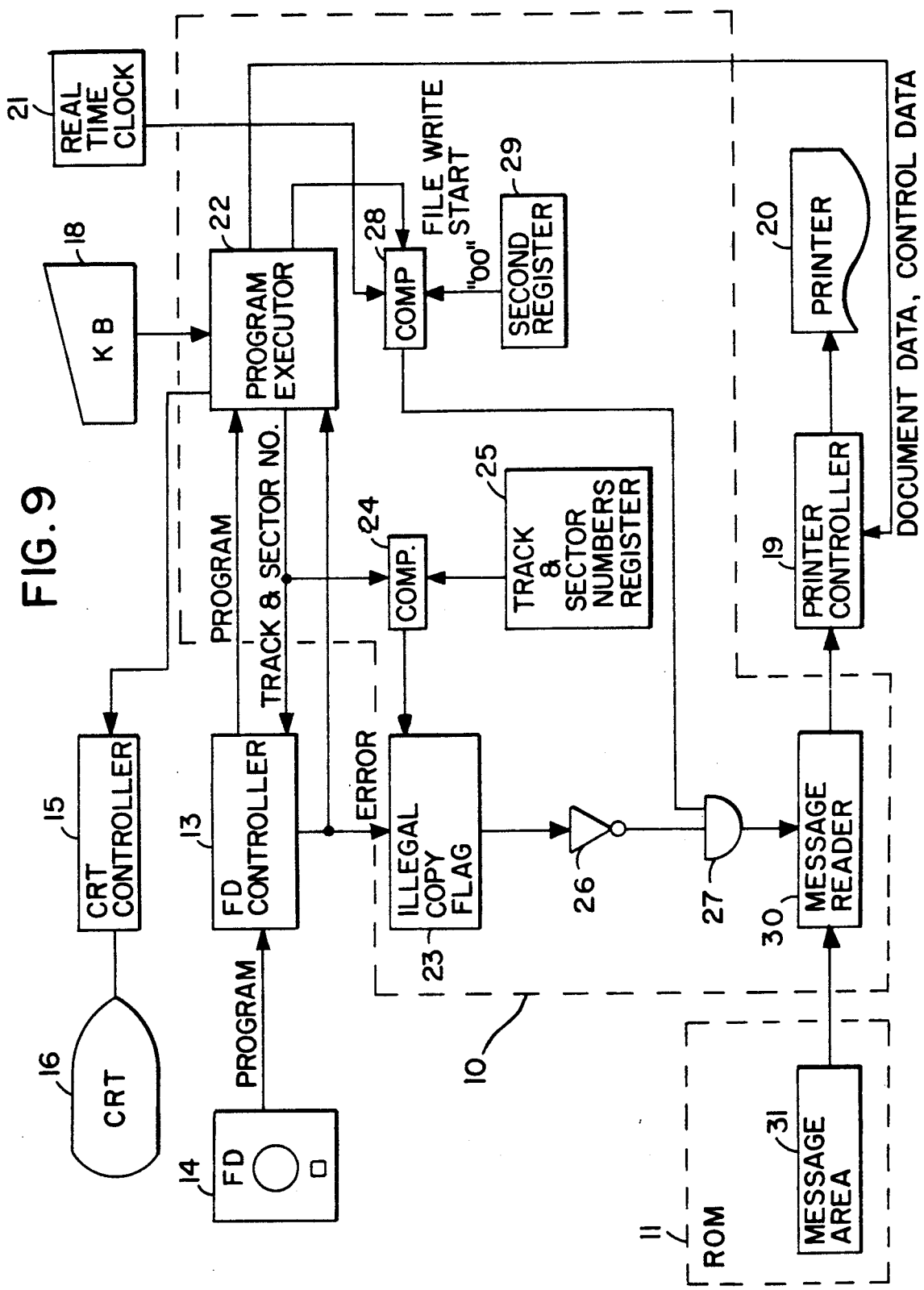
FIG. 9 is block diagram showing an example of the apparatus for carrying out the process shown in FIG. 4.

FIG. 9 illustrates an example which carries out processes shown in FIG. 4, in more detail. For instance, in a case of a word-processor, a program executor 22 reads out programs recorded in a floppy disc 14, and loads the programs in a RAM 12. Under the control of the programs stored in the RAM, a document is produced according to the input supplied from a keyboard 18. At a time when the programs are read out of the floppy disc 14, the program executor 22 gives a track number and a sector number corresponding to a program to be read out to an FD controller 13. The FD controller 13 reads the specific location of the floppy disc 14 corresponding to the track number and the sector number, and sends the program read out from the location to the program executor 22. The FD controller 13 also detects whether an error occurs or not during the reading operation of the floppy disc 14. When an error occurs, the FD controller 13 generates an error signal. The error signal is applied to an illegal copy flag 23. Upon reception of the error signal, the illegal copy flag 23 is set, and outputs a logic signal "1" to an inverter 26. However, when the floppy disc 14 has been copied illegally, no error occurs throughout the reading operation. As a consequence, the illegal copy flag 23 is held in the reset condition even after the completion of the reading-out operation so that the output of the flag 23 becomes "0". Thus the output of the inverter 26 to be applied to an input of an AND gate 27 becomes "1".

To the other input of the AND gate 27 is applied an output signal from a comparator 28. The comparator 28 is actuated by a control data supplied from the program executor 22 for controlling the filing operation of the document (for instance, for controlling printing-out of the document) at a time when the printing operation is initiated. When actuated, the comparator 28 compares the value of second of the present time given from a realtime clock 21 with a value of second "0" beforehand set in a register 29. When the two values coincide, the comparator 28 outputs a logic signal "1" to the AND gate 27.

When the two inputs of the AND gate 27 become "1", that is when the floppy disc 14 is an illegal copy and the second value of the initiation of printing out of the documents is "00", the AND gate 27 actuates a message reader 30. When the message reader 30 is actuated, a message stored in a predetermined area 31 of a ROM 11 is read out to be supplied to a printer controller 19. The message may be composed to state that the document is produced in accordance with an illegally copied word-processor software.

Figure 10:
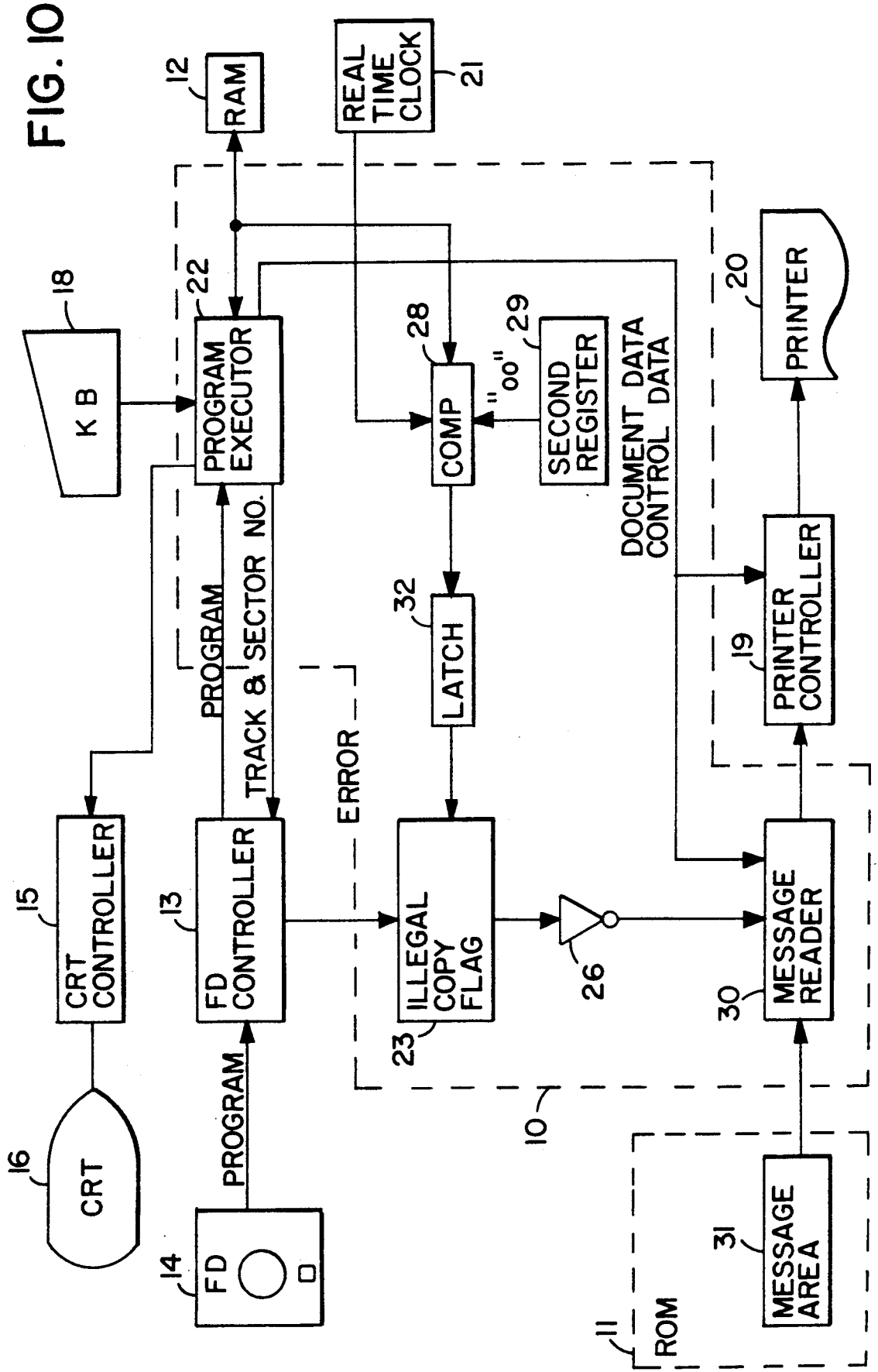
FIG. 10 is a block diagram providing another example of an apparatus which carries out the process shown in FIG. 4.

FIG. 10 illustrates an example which carries out process steps shown in FIG. 5 in more detail. In this example, the comparator 28 is triggered at an instant where loading of programs into the RAM 12 is initiated. The comparator 28 thus detects whether the second value of the initiating instant coincides with a predetermined value "00" or not. In a case where the second value of the initiating instant coincides with the predetermined value "00", the comparator 28 outputs a logic signal "1". The logic signal "1" is latched by a latch circuit 32 so as to be applied to the illegal copy flap 23. The flag 23 can be brought into set state only when the logic signal "1" is applied from the latch circuit 32. However, in a case where the floppy disc 14 has been copied illegally, the flag 23 is maintained in a reset state, so that the inverter 26 continuously applies a logic "1" signal to the message reader 30. At a time when a print out of the document is initiated, the message reader 30 checks the output of the inverter 26, and when the output is found to be "138", the message reader 30 reads out the message from the message area 31 and sends out the message to a printer controller 19.

Therefore, since an erroneous operation is generated at a low probability in the illegally copied semiconductor circuit, even if the copied circuit operates normally temporarily, it is impossible to use or sell these illegally copied circuits in full scale, because there will exist a great risk or damage for violators in the future.

Therefore, when an explanation or message such that a novel copy prevention method is incorporated in this disk or semiconductor chip is attached onto the products, it is possible to effectively prevent illegally copied products.

As described above, in the copy prevention apparatus according to the present invention, since it is difficult to discriminate between an illegal copy and a legal copy, it is not easy to find the protecting method incorporated in the original and therefore remove the protection. In addition, even if an illegal copy operates normally, since there exists a possibility that the protection method is still effective, violators who illegally copied software or semiconductor circuits cannot use or sell the copied products on a large scale, thus preventing illegal copy effectively. On the other hand, since the illegal copy operates normally when used temporarily for trial, for instance, it is possible to fulfil the user's hopes.

The embodiments of the copy prevention apparatus and the method have been described only by way of examples, and therefore the present invention is of course not limited to these embodiments.

What is claimed is:

1. A copy prevention apparatus, comprising:
   illegal copy discriminating means for discriminating whether an object, including computer software, is illegally copied;
   time judging means for judging whether the current time at a preselected moment is a specific time which occurs at or below a predetermined probability; and
   abnormal operation generating means for generating a predetermined abnormal operation if the two conditions of said illegal copy discriminating means having discriminated an illegal copy, and said time judging means having judged that the current time is the specific time, are satisfied.

2. The copy preventive apparatus of claim 1, wherein said illegal copy discriminating means discriminates an illegal copy by checking whether an error occurs when reading a specific position on the software.

3. The copy prevention apparatus of claim 1, wherein said abnormal operation generating means outputs a predetermined message to a computer file unit as an abnormal operation.

4. The copy prevention apparatus of claim 1, wherein said abnormal operation generating means keeps the abnormal operation secret from a user at a time when the two conditions are satisfied, but informs the user of the abnormal operation later to make it difficult to find the time at which abnormal operation occurs.

5. A copy prevention apparatus, comprising:
   illegal copy discriminating means for discriminating whether an object, including computer software, is illegally copied;
   time judging means for judging whether the current time at a preselected moment is a specific time which occurs at or below a predetermined probability; and
   abnormal operation generating means for generating a predetermined abnormal operation if the two conditions of said illegal copy discriminating means having discriminated an illegal copy, and said time judging means having judged that the current time is the specific time, are satisfied;
   wherein the illegal copy discriminating means discriminates whether the object is illegally copied only when the time judging means judges that the current time is the specific time.

6. A copy prevention apparatus, comprising:
   illegal copy discriminating means for discriminating whether an object, including a specific semiconductor circuit, is illegally copied;
   event generating means for generating a constant event at or below a predetermined probability, the event generating means including a circuit for discriminating whether a plurality of signals of the specific semiconductor circuit changes to predetermined values simultaneously; and
   abnormal operation generating means for generating a predetermined abnormal operation if the two conditions of said illegal copy discriminating means having discriminated an illegal copy, and said event generating means having generated the constant event, are satisfied;
   wherein said illegal copy discriminating means, said event generating means and said abnormal operation generating means are included in the specific semiconductor circuit, formed on the same semiconductor substrate together with the specific semiconductor circuit, and copied simultaneously when the specific semiconductor circuit is copied.

7. The copy prevention apparatus of claim 6, wherein said illegal copy discriminating means includes a dummy element incorporated in the specific semiconductor circuit which generates an erroneous operation in the specific semiconductor circuit when functioning.

8. A copy prevention apparatus comprising:
   illegal copy discriminating means for discriminating whether an object, including a specific semiconductor circuit, is illegally copied, the illegal copy discriminating means being a dummy element incorporated in the specific semiconductor circuit and generating an erroneous operation in the specific semiconductor circuit when functioning;
   event generating means for generating a constant event at or below a predeterimined probability, said event generating means being a circuit for discriminating whether a plurality of signals of the specific semiconductor circuit changes to predetermined values simultaneously; and
   abnormal operation generating means for generating a predetermined abnormal operation if the two conditions of said illegal copy discriminating means having discriminated an illegal copy, and said event generating means having generated the constant event, are satisfied, said abnormal operation generating means being a specific semiconductor circuit in which the dummy element is incorporated;
   wherein said illegal copy discriminating means, said event generating means and said abnormal operation generating means are included in the specific semiconductor circuit, formed on the same semiconductor substrates together with the specific semiconductor circuit, and copied simultaneously when the specific semiconductor circuit is copied.

9. A method for preventing illegal copying, comprising the steps of:
   (a) discriminating whether an object, including computer software, is legally copied;
   (b) judging whether the current time at a preselected moment is a specific time which occurs at or below a predetermined probability; and
   (c) generating a predetermined abnormal operation only if the two conditions for an illegal copy having been discriminated, and the current time having been the specific time, are satisfied.

* * * * *